_United States Patent_ [19]

Potter

[11] 4,107,946
[45] Aug. 22, 1978

[54] LOW HEAT LOSS LIQUID HELIUM DISCONNECT ATTACHMENT AND SYSTEM

[75] Inventor: Vernon L. Potter, Torrance, Calif.

[73] Assignee: The United States of America as represented by the Secretary of the Navy, Washington, D.C.

[21] Appl. No.: 793,335

[22] Filed: May 3, 1977

[51] Int. Cl.² .................. F17C 13/04; F17C 13/10
[52] U.S. Cl. .................. 62/514 R; 62/45; 62/292; 62/293
[58] Field of Search .............. 62/514, 292, 293, 45, 62/55

[56] References Cited
U.S. PATENT DOCUMENTS

| 3,152,452 | 10/1964 | Bond, Jr. | 62/45 |
| 3,696,627 | 10/1972 | Longsworth | 62/514 |

_Primary Examiner_—Allen M. Ostrager
_Attorney, Agent, or Firm_—R. S. Sciascia; L. I. Shrago; C. E. Vautrain, Jr.

[57] ABSTRACT

An easily maintainable interface for magnet dewars which includes a low heat leakage disconnect fitting that retains the vacuum integrity of both the dewar and the transfer line is provided. The fitting includes a bayonet-type insert having separate coils disposed about a central conduit for cooling or heating the unit depending upon intended use. Liquid helium is introduced axially through the bayonet which is adjustable to a purge position wherein either gaseous or liquid helium may be introduced to clean, heat or cool the unit, or a flow position wherein liquid helium is passed through the bayonet into the supply line.

20 Claims, 6 Drawing Figures

LOW HEAT LOSS LIQUID HELIUM DISCONNECT ATTACHMENT AND SYSTEM

This invention concerns transfer conduits for cryogenic liquid and, more particularly, an easily defrosted fitting which closes the fluid lines on disconnection to minimize contamination.

Bayonet connectors currently available for helium and other cryogen transfer lines are generally unacceptable due to high heat leakage that results in losing on the order of 5 to 6 Btu per hr, which is substantially the total dewar heat leak due to all other heat transfer modes. Contamination protection features are known to be available only for small fluid line connectors in the form of separate dust covers. Small folded-bayonet connectors are available which provide fluid line closure and reduce heat loss to substantially 2 Btu per hr, however, these are not suitable for use in large volume helium transfer systems.

It is well known that in an overall liquid helium transfer, system consumption is significantly affected by transfer line performance. A review of commercially available superinsulated transfer lines has demonstrated that the lines themselves were readily available but that a low heat loss disconnect means for use therewith was not available. It is, therefore, necessary to produce a low-heat loss disconnect for use in large volume systems to increase system efficiency. The present invention provides a low heat loss disconnect in which heat transfer is reduced to on the order of from 0.4 to 0.2 Btu per hr and which also allows disconnect of the liquid helium supply source without deactivation of a superconducting coil, among other advantages.

Accordingly, it is an object of the present invention to provide a low heat loss liquid helium disconnect means and system which is compact and permits disconnection of the supply source without deactivation of an associated superconducting coil.

Another object of this invention is to provide a low heat loss liquid helium disconnect which is adapted to purge as well as heat or cool the coupling and attachment on initial hookup to a transfer line.

A further object of this invention is to provide a low heat loss liquid helium disconnect which affords coupling and transfer line cool down before hookup to the coil dewar without contaminating either the coil dewar, the transfer line or the supply dewar.

A further object of this invention is to provide a low heat loss liquid helium disconnect means and system which utilizes only supply fluid extracted from the supply stream to accomplish vapor cooling of the disconnect for low thermal input. The disconnect should also be adapted to cool the upstream transfer line so as to reduce significantly the thermal input to the entire transfer line.

Other objects, advantages and novel features of the invention will become apparent from the following detailed description thereof when considered in conjunction with the accompanying drawings in which like numerals represent like parts throughout and wherein.

The present invention, in general, concerns an interface means and method for use with magnet dewars which provides a low heat leakage disconnect fitting that retains the vacuum integrity of both the dewar and the transfer line. A bayonet-type insert with an axial flow passage and coils formed thereabout for conducting gaseous and liquid helium either warms or cools the attachment and the dewar depending upon the contemplated use. In the purge position, a probe is positioned to avoid contact with a ball valve by external flanges. Helium is allowed to flow into the coupling through the axial passage to purge the atmospheric gases trapped during the insertion of the probe in the dewar half of the disconnect. Once purged, liquid helium is allowed to flow through the axial passage from the supply dewar and to refrigerate the transfer line and disconnect members. The fluid flow exits through a discharge port in the input end of the attachment via a chamber surrounding the bayonet. The exit fluid passes through a coiled conduit to refrigerate a radiation shield used to further reduce the heat transfer to the central axial flow conduit. Once an appropriate level of temperature is achieved, an external flange is rotated approximately 45° relative to the dewar, thereby causing the flanges to compress axially and allowing the probe to unseat the ball valve. Liquid helium is thereby allowed to pass from the transfer system into the magnet dewar. A portion of the gas generated in the transfer line along its length is continued to be extracted through the coiled axial tube along the radiation shield to maintain an effective barrier to radiant heat transfer into the liquid helium contained in the central axial flow conduit.

Figure 1:
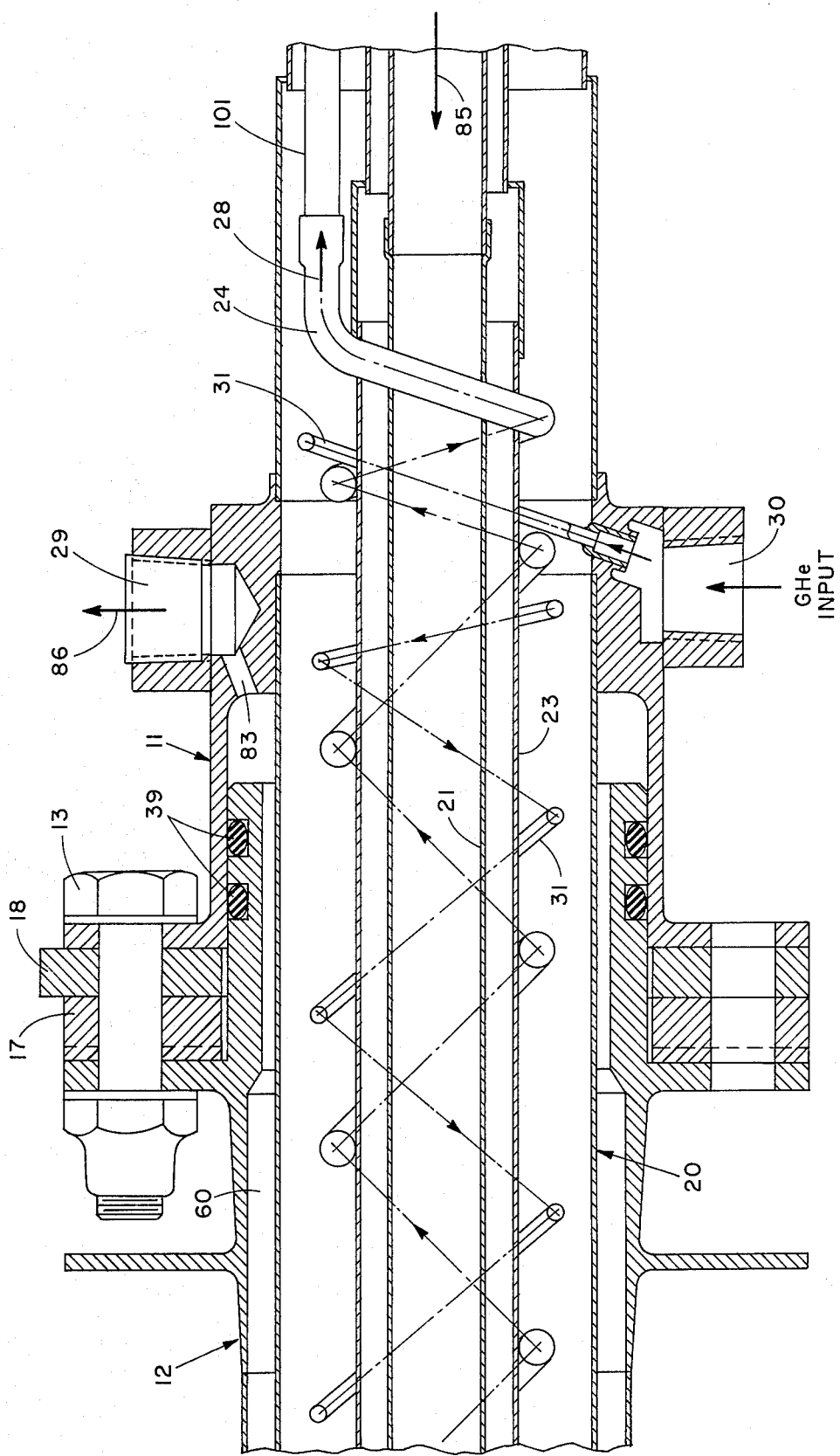
FIG. 1 is a partial sectional view of one embodiment of the present invention showing the coupling between a coil dewar and the bayonet attachment of the invention.
Figure 2:
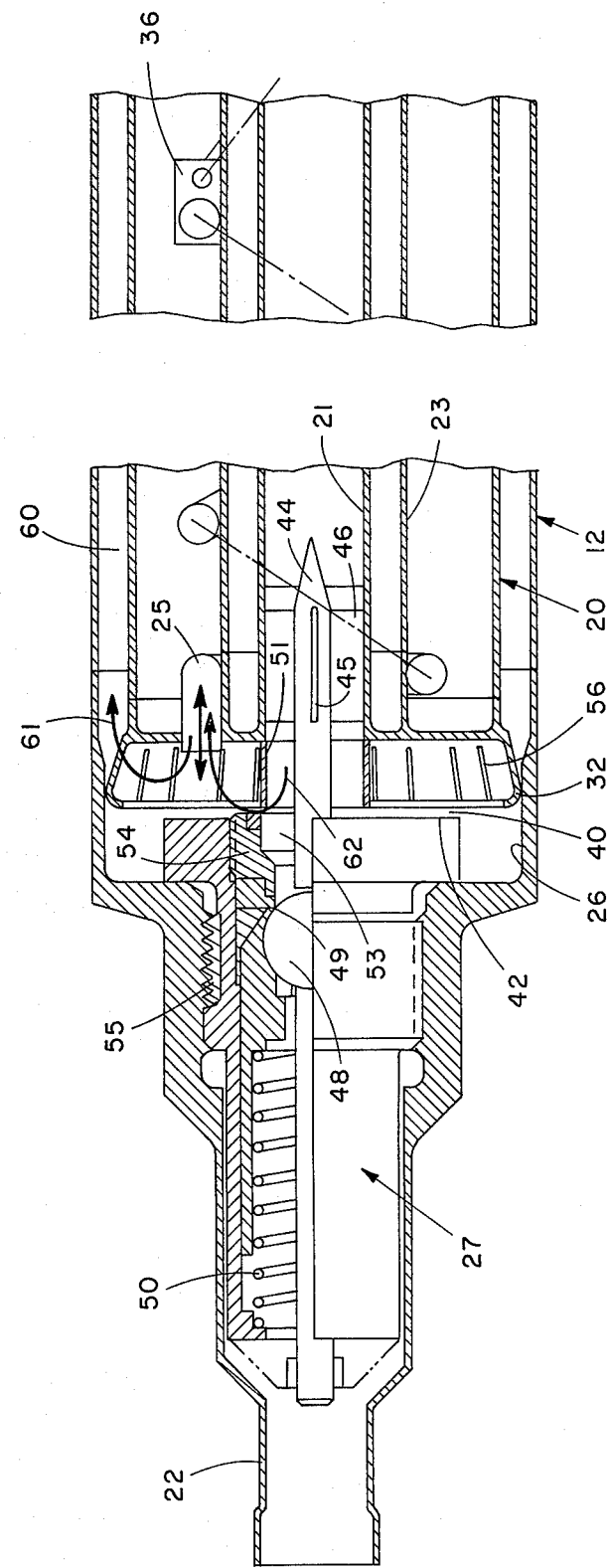
FIG. 2 is a partial sectional view of that portion of the dewar and bayonet attachment not shown in FIG. 1.
Figure 4:
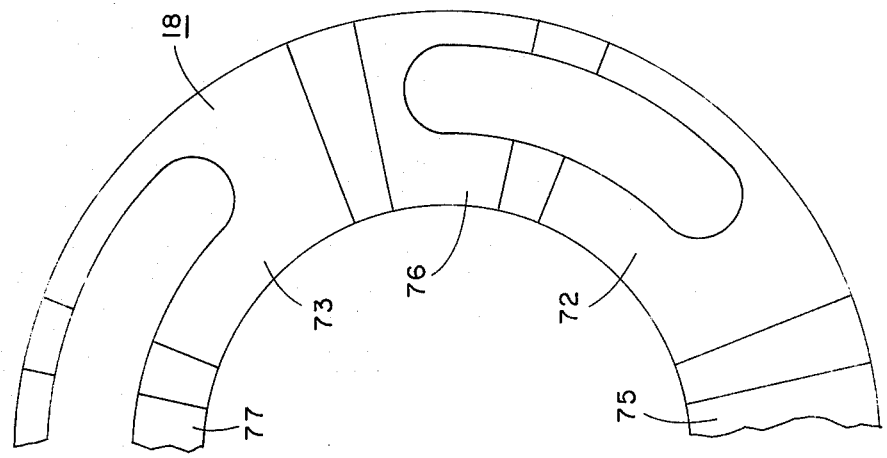
FIG. 4 is a plan view of a portion of a movable flange employed in coupling the attachment to the dewar.

Referring to the drawings, FIGS. 1 and 2 taken together show the components of the invention which include a male bayonet attachment 11 coupled to a coil dewar via the female portion of the coupling 12 by a plurality of bolts 13 which extend through a fixed disc 17 and a selectively rotatable disc 18. A bayonet tube 20 is secured to attachment 11 and contains an inner cylinder 21, which forms an axial passage of substantially the same diameter as that of an associated transfer line 22, and an intermediate cylinder 23 which is selectively spaced from cylinder 21 to form an insulating space between the cylinders. A vapor-cooled line 24 is coiled about cylinder 23 to form a vapor-cooled shield (VCS) and terminates at the end of bayonet 20 at point 25, communicating with a volume bounded by bayonet 20, the female portion of the disconnect 12, a ball valve assembly housing 26 and a ball valve assembly 27. Line 24 provides a passage for gaseous helium flow through the bayonet VCS, terminating at an exit in the vicinity of arrow 28 which communicates with a like conduit in the supply transfer line to provide VCS refrigeration. Attachment 11 further includes a purge exit 29 and a purge inlet port 30, the latter communicating with a purge line 31 which also is coiled about cylinder 23 along with line 24 and extends a substantial distance therealong toward a resilient nozzle 32 to the end of bayonet 20 and terminates in a manifold 36 where communication with line 24 is provided. Attachment 11 and dewar receptacle 12 are maintained in sealing relationship in all modes of operation by a pair of elastomeric seals 39.

Resilient nozzle 32 is received in an area 40 which is effected by a constricting surface 42, causing suitable compression of the nozzle perimeter as it enters area 40. Cylinder 21 has mounted at this end a probe 44 which is secured therein by brackets 45 and 46, with the upstream end of probe 44 aerodynamically configured and the downstream end thereof terminating in a flat surface for abutment against a ball 48 that is continuously urged against a seat 49 by a spring 50. Nozzle 32 includes a cylindrical extension 51 of cylinder 21 which is adapted, in the purge and flow condition of attachment 11, to meet in a flow routing relationship with a passage 53 in a ring 54 in assembly 27 which assembly is secured in this end of dewar receptacle 12 by conventional means such as threads 55. Means are provided in nozzle 32 via slots 56 circumferentially located around nozzle 32 to permit fluid communication from line 21 into a circumferential chamber 60 which is formed by the walls of bayonet 20 and dewar receptacle 12 as indicated by arrow 61 thereby providing a static pressure gas film and an associated thermal gradient between the refrigerated end of the disconnect and ambient when the attachment is in either the operative or purge conditions. Arrow 62 identifies the path followed by a portion of the gas entering chamber area 40 which is extracted through line 24 for purposes of VCS refrigeration.

Figure 3:
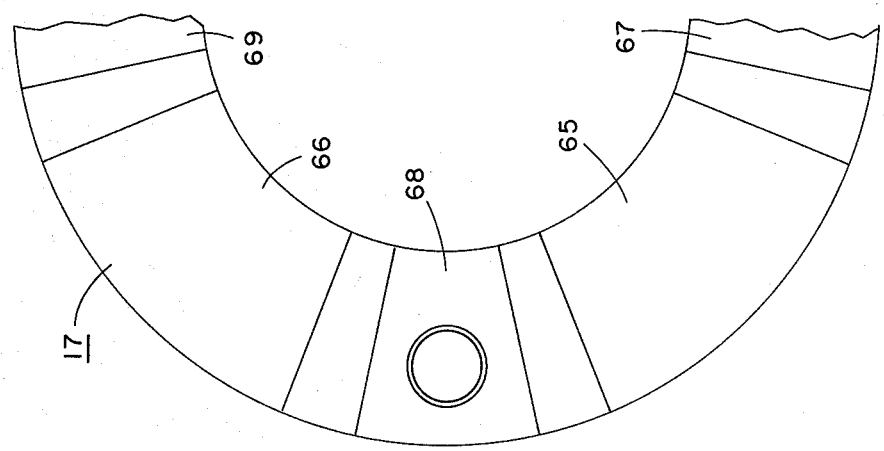
FIG. 3 is a plan view of a portion of a fixed flange employed in coupling the attachment to the dewar.
Figure 5:
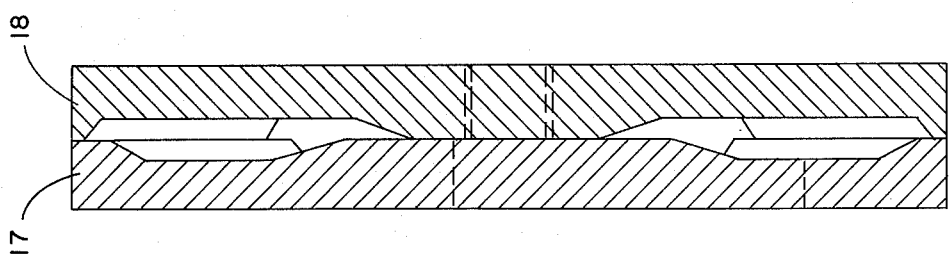
FIG. 5 is a sectional view of the flanges of FIGS. 3 and 4 mated in the transfer line-disconnect purge position.

FIGS. 3-6 illustrate the means by which attachment 11 may be easily changed from the operative or flow condition to the purge position and vice versa. Disc 17 in FIG. 3 is the fixed disc and is provided with a plurality of raised portions 67-69 and recessed portions 65, 66 which are positioned opposite respective recessed portions 75-77 and raised portions 72, 73 of free or rotatable disc 18 shown in FIG. 4. In the position of attachment 11 in FIGS. 1 and 2, discs 17 and 18 are disposed in the purge position as shown in FIG. 5 in which position probe 44 is displaced from engagement with ball 48. To advance attachment 11 to the fluid through-flow position, disc 18 is rotated substantially 45° from the position shown in FIG. 1 which rotation causes the discs to assume the positions shown in FIG. 6 thereby allowing attachment 11 to move toward ball valve assembly 27 an amount indicated in phantom at 80 in FIG. 6.

In operations where dewar receptacle 12 and attachment 11 are warm, the latter is inserted into the former and disc 18 is rotated to the position shown in FIG. 5 which is the purge position. This allows probe 44 to retain ball 48 on seat 49, and therefore the coil dewar fluid chamber, which is connected to the downstream side of tube 22, remains isolated from the contaminated atmosphere contained within the newly mated coupling and the supply transfer line upstream of the coupling pair.

The system may be purged by introducing liquid helium in small quantities from a supply dewar into the helium liquid transfer line attached to cylinder 21 near arrow 85. This liquid helium is vaporized by the warm walls of the conduit and provides pure helium purge gas throughout the length of the conduit. The gaseous helium passes through cylinder 21 into cavity 40 and is then directed to VCS line 24 as indicated by arrow 62 and/or through slots 56 in nozzle 32, as indicated by arrow 61, and chamber 60 to exit port 29, where the gas is discharged through a control valve, not shown, located in port 29 to the atmosphere - or the gaseous helium may be captured for reuse as in a closed cycle liquefaction system. The gas allowed to enter the VCS tube at 25 is directed through this tube, exiting at arrow 28 into the VCS tube of the transfer line where the purge gas is similarly used to eliminate contaminating gases within the transfer line. This action provides a through sweep of all cavities within the disconnect and transfer system, eliminating all contaminating atmospheric gases. After purge, the entire transfer system is cooled down in the following manner: liquid helium is allowed to continue to enter into cylinder 21 from a storage dewar, not shown. The flow through exit port 29 is eliminated thereby directing all discharge flow through VCS tube 24 and the corresponding tube in transfer line 101.

Figure 6:
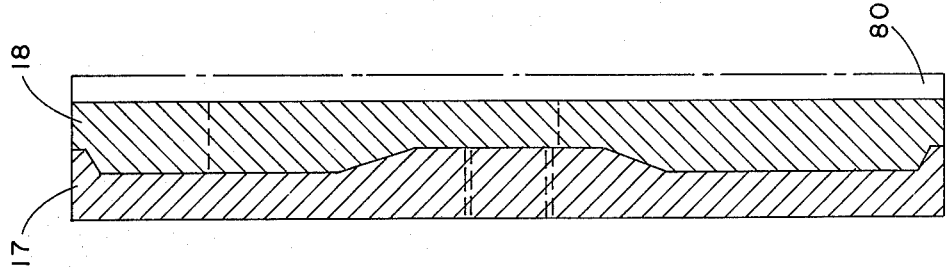
FIG. 6 is a sectional view of the flanges of FIGS. 3 and 4 engaged by rotation to the liquid helium through-flow position.

When cooled to an acceptable level, disc 18 is rotated to the flow position shown in FIG. 6, allowing attachment 11 to move further into dewar receptacle 12 thereby unseating ball 48 from seat 49 and allowing fluid flow from cylinder 21 through valve assembly 27 and conduit 22 into the liquid helium storage volume of, in one use, a superconducting magnet. At this time bolts 13 are tightened. Pneumatic isolation of the helium gas with respect to the operating environment is maintained throughout all operations of the system by elastomeric seals 39.

In instances where the dewar and the attachment are cold and disconnect of the system is desired, liquid helium flow is stopped at the supply dewar, not shown. Bolts 13 are loosened and disc 18 is rotated to the purge position of FIG. 5, placing ball 48 on seat 49. This isolates the magnet dewar, via dewar receptacle 12, from the supply function and permits the introduction of warm gaseous helium at port 30. Port 29 is now opened, allowing gaseous helium to enter the helium transfer system through line 31 and discharge into manifold 36. At this juncture, the gas may take two paths: the helium may be directed down tube 24 discharging into chamber 40, exit through slots 56 in nozzle 32, through chamber 60 and passage 83 to port 29 as indicated by arrow 86 and/or be directed upstream through VCS line 24 as indicated by arrow 28 into the transfer line VCS tube 101. After the coupling has warmed to room temperature, attachment 11 may be removed from dewar 12 without frosting and without moisture contamination. Ground handling protective caps, not shown, may be installed on both the attachment and into dewar receptacle 12 for succeeding operations.

An increased reduction in heat leakage is accomplished with the present invention by the incorporation of the vapor-cooling station comprising coil 24 in bayonet 20. This cooling is effected by the vent stream through conduit 24 which is attached to the vapor cooled shield 23 along its length. Thus, the disconnect performance depends upon vapor cooling flow rate and the VCS temperature. For a 40,000 hp propulsion motor, the heat leakage has been determined to vary from approximately 0.4 Btu per hr at no liquifier transfer line loss to 0.2 Btu per hr at 75% vapor content at the dewar supply interface.

The invention, in summary, provides a low heat leakage, small package coupling which allows disconnect of the supply source without deactivation of the superconducting coil. It allows for purge capability for initial hookup of a coupling to discharge gaseous contamination. It presents a warm-up capability which allows disconnect after a period of liquid flow within a short period of time without contamination of the coil dewar fluid or formation of ice or condensation of moisture on or within the disconnect or transfer line members. It permits maintaining a helium consumption system operational while disconnecting the helium supply and installing a new one. It also provides a coupling and transfer line cool-down capability before hookup to the coil dewar without contamination of either the coil dewar, the transfer line or the supply dewar. Only supply fluid, i.e. gas, extracted from the supply stream is used to provide vapor cooling of the disconnect for low thermal input. The fluid is then used to cool the upstream transfer line to also significantly reduce the thermal input to the transfer line. All sealing of the 4.2° K fluids is accomplished at room temperature.

Obviously, many modifications and variations of the present invention are possible in the light of the foregoing teachings.

What is claimed is:

1. A low heat leakage disconnect fitting adapted to interface with magnet dewars and which retains the vacuum integrity of both the dewar and a transfer line connected thereto comprising:
    a bayonet-type insert for said dewars having an axial flow passage;
    an enclosed inner annular chamber in said insert formed about said axial passage for insulating the passage;
    an enclosed outer annular chamber in said insert and means in said outer chamber for conducting gases in both gaseous and liquid form adjacent to the periphery of said inner annular chamber to control the temperature of said dewar and said insert;
    means in said insert for selectively diverting the fluid in said axial passage to the periphery of said insert; and
    means common to said dewar and said insert for admitting and exiting said gases,
    said means for diverting fluid including means for selectively preventing axial flow of fluid from entering said outer chamber,
    whereby said insert when in the purge position directs fluid from said axial passage into said means for conducting gases and to the periphery of said insert to selectively alter the temperatures thereof, and when in the through-flow position prevents lateral dispersion of gases from said axial passage.

2. The fitting as defined in claim 1 wherein the periphery of said outer chamber forms with said dewar an annular passage for exiting said gases and said means for diverting fluid includes a nozzle and a probe connected to the discharge end of said bayonet and a valve assembly in said dewar adjacent to said probe and selectively operable by said probe to alternate purge and through-flow positions.

3. The fitting as defined in claim 2 wherein said insert includes a header having an inlet for admitting gas into said means for conducting gases and an outlet for discharging gas from said annular passage, and said means for conducting gases includes a vapor-cooled line extending from said nozzle to an external fluid transfer line at the end of said axial passage remote from said nozzle and a purge line extending from said header inlet toward said nozzle; and
    a manifold in said outer chamber positioned intermediate said header inlet and said nozzle,
    said purge line terminating in said manifold and communicating therein with said vapor-cooled line so that said dewar and said insert may be purged and temperature controlled while in the through-flow position by purge gas passing through said purge line, said manifold, said vapor-cooled line, the area surrounding said nozzle, and said annular passage.

4. The fitting as defined in claim 3 wherein said means for selectively preventing axial flow of fluid include a cylindrical extension in said nozzle of said axial passage, a ball valve in said valve assembly displaceable by said probe, a chamber in said valve assembly for receiving one end of said extension when in the through-flow position, and means for selectively adjusting said insert to the through-flow and purge positions.

5. The fitting as defined in claim 4 wherein said means for adjusting said insert include respective flanges on said insert and said dewar and at least two discs adapted to be positioned and secured between said flanges,
    at least one of said discs adjustably rotatable to two alternate positions,
    the combined thicknesses of said discs positioning said nozzle with respect to said valve assembly successively in the through-flow and purge positions.

6. The fitting as defined in claim 5 wherein said discs have respective raised and recessed surfaces so that when said recessed surfaces contact one another said insert is retracted to the purge position and when said raised surfaces contact one another said insert is advanced to the through-flow position.

7. The fitting as defined in claim 6 wherein said nozzle is metallic and made resilient by a plurality of axial slots and the inner diameter of said dewar is reduced adjacent said valve assembly to selectively compress said nozzle before said insert reaches the purge position.

8. The fitting as defined in claim 7 wherein in the purge position fluid flows through said axial passage and said nozzle slots into said vapor-cooled line and said annular passage, and in the through-flow position fluid in said axial passage is conducted directly to said transfer line while fluid for controlling the temperature of said dewar and said insert is introduced at said header inlet and flows through said purge line to said manifold and from said manifold oppositely through said vapor-cooled line to said annular passage and around the periphery of said inner annular chamber.

9. A system for purging and/or warming or cooling a magnet dewar or other similar vessels comprising:
    a multi-tubular interface adapted for insertion into and connection to said dewar and having a plurality of concentric passages and means sealing the contacting surfaces of said interface and said dewar at each end thereof;
    said sealing means including a peripherally sealing nozzle secured to the end of said interface first inserted into said dewar,
    the inner of said passages adapted to connect supply and outlet transfer lines,
    the next outer of said passages insulating said inner passage;
    individual purge and vapor-cooled lines deployed in the outer of said passages for effecting purging of said inner passage and temperature change of said dewar; and a transfer assembly in said dewar and means for seating said nozzle adjacent said transfer assembly so as to allow successively for through flow of fluid and for peripheral diversion of fluid to effect said purging and temperature change.

10. The system as defined in claim 9 wherein said nozzle includes an extension of said inner passage and said transfer means includes a chamber for receiving said extension in substantially sealing relationship when said interface is in the through-flow position.

11. The system as defined in claim 10 wherein said means for axially positioning said interface includes adjustable spacer means inserted at the connection of said interface and said dewar, said spacer means rotatable about said dewar so as to axially advance said extension into said chamber for through flow of fluid and to axially retract said extension clear of said chamber for purging and temperature change.

12. The system as defined in claim 11 wherein the inlet of said vapor-cooled line is positioned within said nozzle and the periphery of said interface and the adjacent wall of said dewar form an annular chamber, said nozzle slotted to permit flow of fluid into said annular chamber, said interface including an outlet for said annular chamber at its end remote from said nozzle.

13. The system as defined in claim 12 wherein said vapor-cooled line is a helical tube which conducts fluid from said nozzle to a discharge connection remote from the outer end of said interface and said purge line is a helical tube which conducts fluid from the outer end of said interface toward said nozzle;

a manifold in said outer passage positioned a substantial distance from said nozzle, said purge line terminating in said manifold and communicating therein with said vapor-cooled line so that said dewar and said interface may be purged and temperature controlled while in the through-flow position by purge gas passing through said purge line, said manifold, said vapor-cooled line, the area surrounding said nozzle, and said annular chamber.

14. The system as defined in claim 13 and further including respective flanges on said interface and said dewar at the connection thereof, said spacer means positioned between said flanges and including at least two discs one of which is adjustably rotatable to two alternate positions, the combined thicknesses of said discs positioning said nozzle with respect to said transfer assembly successively in the through-flow and purge positions.

15. The system as defined in claim 14 wherein said discs have respective raised and recessed surfaces so that when said recessed surfaces contact one another said interface is retracted to the purge position and when said raised surfaces contact one another said interface is advanced to the through-flow position.

16. The system as defined in claim 15 wherein in the purge position fluid flows through said inner passage and said nozzle slots into said vapor-cooled line and said annular chamber, and in the through-flow position fluid in said inner passage is conducted directly into said transfer assembly while fluid for purging and controlling temperature flows through said purge line to said manifold and from said manifold oppositely through said vapor-cooled line and through said annular chamber.

17. A low heat loss liquid helium disconnect system which affords coupling and transfer line cool down before hookup to a coil dewar without contaminating either the coil dewar, the transfer line or the supply dewar comprising:

a multi-chambered bayonet interface adapted for insertion into said coil dewar;

means adjustably connecting said interface to said dewar in purge and through-flow positions at substantially the entrance to said dewar; and means in said dewar for receiving the forward end of said interface in said adjustable purge and through-flow positions, said interface having an axial chamber directly coupled to said dewar in the through-flow position and an outer chamber having purge and vapor-cooled helium conducting lines extending substantially therethrough for effecting purging and temperature control, said lines having a common manifold a substantial distance from the forward end of said interface, the periphery of said interface and said dewar forming an annular passage for exiting helium, whereby said interface when in the through-flow position directs supply helium only to said dewar and purge helium through said lines and said annular passage, and in the purge position directs supply helium and purge helium through said lines and said annular passage.

18. The system as defined in claim 17 and further including a nozzle secured to the forward end of said interface and means in said dewar for receiving said nozzle in sealing relationship therewith;

the inlet of said vapor-cooled line disposed in said nozzle, said nozzle having axial slots permitting communication between said vapor-cooled line and said annular passage; and a seal in said dewar resiliently urged against a seat to block passage of helium therethrough and a probe in said nozzle displacing said seal when said interface is in the through-flow position.

19. The system as defined in claim 18 wherein said adjustably connecting means include spacer means rotatable about said dewar to advance said probe for through flow of fluid and retract said probe for purging and temperature change using both supply helium and purge helium.

20. The system as defined in claim 19 wherein said vapor-cooled line is a helical tube which conducts helium from said nozzle to a discharge connection remote from the connected end of said interface and said purge line is a helical tube which conducts helium from the connected end of said interface toward said nozzle, said purge line terminating in said manifold and communicating therein with said vapor-cooled line to permit purging and temperature control when said interface is in the through-flow position.

* * * * *